United States Patent
Elikhis et al.

(10) Patent No.: US 12,505,564 B2
(45) Date of Patent: Dec. 23, 2025

(54) METHOD AND AN APPARATUS FOR SELECTING A PIXEL'S MASK

(71) Applicant: INUITIVE LTD., Ra'anana (IL)

(72) Inventors: Edward Elikhis, Ra'anana (IL); Dor Peretz, Kfar Saba (IL)

(73) Assignee: INUITIVE LTD., Ra'anana (IL)

( * ) Notice: Subject to any disclaimer, the term of this patent is extended or adjusted under 35 U.S.C. 154(b) by 367 days.

(21) Appl. No.: 18/156,061

(22) Filed: Jan. 18, 2023

(65) Prior Publication Data

US 2024/0242361 A1  Jul. 18, 2024

(51) Int. Cl.
*G06T 7/33* (2017.01)
*G06F 17/10* (2006.01)

(52) U.S. Cl.
CPC ............ *G06T 7/33* (2017.01); *G06F 17/10* (2013.01)

(58) Field of Classification Search
CPC ..... G06T 7/50–596; G06T 7/97; G06T 7/207; G06T 7/223–238; G06T 7/30–38; G06F 17/10; H04N 19/51–583
See application file for complete search history.

(56) References Cited

U.S. PATENT DOCUMENTS

| | | | |
|---|---|---|---|
| 10,410,368 B1* | 9/2019 | Galor Gluskin ..... | H04N 25/704 |
| 2007/0286476 A1* | 12/2007 | Kim .................. | G06V 10/24 |
| | | | 382/154 |
| 2023/0051270 A1* | 2/2023 | Takemura ........ | G06V 10/7515 |
| 2024/0242361 A1* | 7/2024 | Elikhis ............... | G06T 7/33 |

* cited by examiner

*Primary Examiner* — Sean T Motsinger (74) *Attorney, Agent, or Firm* — FisherBroyles, LLP; Roger L. Browdy; Ronni S. Jillions (57) ABSTRACT

A computational platform and a method for use in a process of matching pairs of pixels, wherein each of the members of a pixel's pair belong to another image captured by a different image capturing sensor, and wherein the computational platform comprises at least one processor configured to carry out a process of matching pairs of pixels based on selecting a pixel mask to be used by selecting neighboring pixels of a given pixel from among all of its neighboring pixels, will be used for the matching process of said given pixel with the other member of its pixel's pair.

5 Claims, 7 Drawing Sheets

METHOD AND AN APPARATUS FOR SELECTING A PIXEL'S MASK

TECHNICAL FIELD

The present disclosure generally relates to methods and apparatus for use in optical devices, and more particularly, for improving processing capabilities for computer visual applications.

BACKGROUND

A stereoscopic camera arrangement is an apparatus made of two camera units, assembled in a stereoscopic module. Stereoscopy (also referred to as "stereoscopics" or "3D imaging") is a technique for creating or enhancing the illusion of depth in an image by means of stereopsis. In other words, it is the impression of depth that is perceived when a scene is viewed with both eyes by someone having normal binocular vision, which is responsible for creating two slightly different images of the scene in the two eyes due to the eyes'/camera's different locations.

Combining 3D information derived from stereoscopic images, and particularly for video streams, requires search and comparison of a large number of pixels to be held for each pair of images, derived from different image capturing devices.

One of the major hurdles associated with a matching process for a given pixel is how to select a right mask, wherein a pixel mask is a 2D image whose pixel values are used to filter images. More particularly, how to select which pixels will be used for the calculation of the matching process for that given pixel.

The following examples illustrate the problem at hand.

Figure 1:
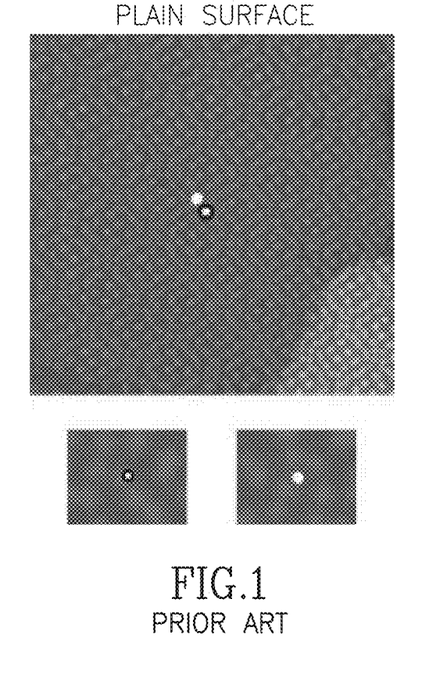
FIG. 1 illustrates an example of a prior art image where two points are demonstrated lying on a plain surface.

In FIG. 1 two points are demonstrated lying on a plain surface. Let us assume that one needs to carry out a matching process for these two points. Two matching windows shown at the bottom of the figure, reflect information that will be used for the matching procedure. However, this information relates only to the pattern projected onto the plain that can be used for the matching procedure.

Figure 2:
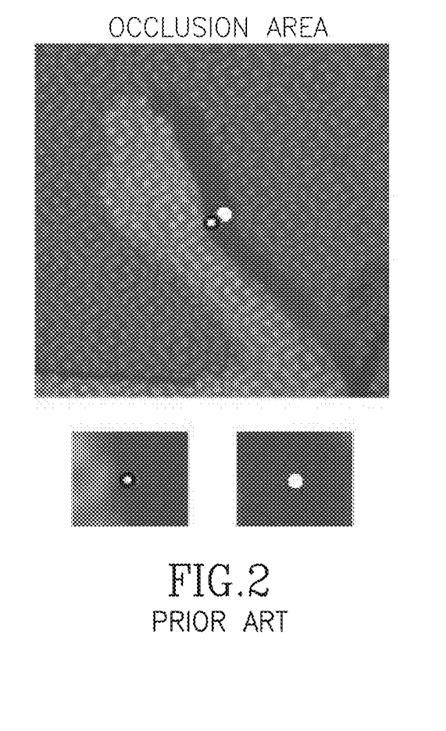
FIG. 2 illustrates an example of a prior art image where the two points presented lie in the occlusion area.

FIG. 2 presents two points that lie in the occlusion area, one (to be referred to herein as "1") which is bigger than the other (to be referred to herein as "2"). As may be seen in this figure, point 2 lies near the foreground hand's image and a "blind" matching window positioned around this point comprises part of the information that relates to the foreground hand. This fact leads to wrong matching results that will be applied while carrying out a disparity calculation. Point 1 lies in the middle of the occlusion region and hence its matching window includes only "shadow" points. This is the type of information that is unavoidably used for all points that relate to the occlusion area.

Figure 3:
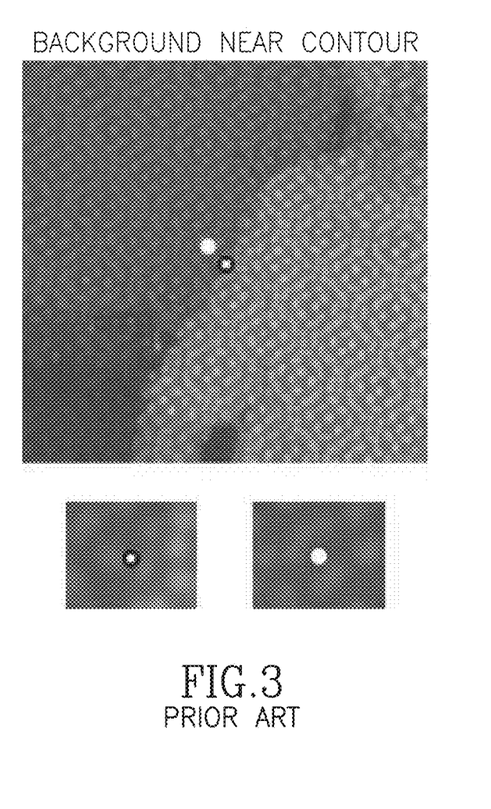
FIG. 3 demonstrates a prior art example where the two points presented are associated with background surface.

FIG. 3 demonstrates two points that are associated with the background surface. Both background and foreground surfaces include the projected pattern, where point 1 lies near the border in the foreground i.e., contour) and its associated matching window includes part of the information that relate to the foreground hand. As in the case of the occlusion area of FIG. 2, this fact leads to achieving wrong results.

The present invention seeks to provide a solution that overcome these problems.

SUMMARY OF THE DISCLOSURE

The disclosure may be summarized by referring to the appended claims.

It is an object of the present disclosure to provide a method and apparatus that implement an innovative method that enables carrying out an improved selection of a pixels' mask around pixels located in areas of interests.

Moreover, this solution comprises adaptation of geometrical parameters (generating the proper height and width for the directional masks) to suit a given optical system, and/or a projected pattern, and/or image sensor's (e.g., camera) field of view (FOV) and/or image sensors' (e.g., cameras) resolution.

It is another object of the present disclosure to provide a method and apparatus that enable adapting geometrical parameters of the pixel's masks used to suit a given optical system, and/or a projected pattern, and/or the image sensor's field of view (FOV) and/or the image sensors' resolution.

Other objects of the present invention will become apparent from the following description.

According to a first embodiment of the present disclosure, there is provided a computational platform for use in a process of matching pairs of pixels, wherein members of a pixel's pair belong each to another image captured by a different image capturing device (sensor), and wherein the computational platform comprises at least one processor configured to carry out a process of matching pairs of pixels based on selecting a pixel mask to be used by selecting which neighboring pixels of a given pixel from among all of its neighboring pixels, will be used for the matching process of said given pixel with the other member of its pixel's pair.

The term "computational platform" as used herein throughout the specification and claims, is used to denote a number of distinct but interrelated units for carrying out a computational process. Such a computational platform can be a computer, or a computational module such as an Application-Specific Integrated Circuit ("ASIC"), or a Field Programmable Gate Array ("FPGA"), or any other applicable processing device.

The terms "image capturing device", "image capturing sensor" and "image sensor" as used herein interchangeably throughout the specification and claims, is used to denote a sensor that detects and conveys information used to make an image. Typically, it does so by converting the variable attenuation of light waves (as they pass through or reflect off objects) into signals. The waves can be light on another electromagnetic radiation. An image sensor may be used in robotic devices, AR/VR glasses, a drone, a digital camera, smart phones, medical imaging equipment, night vision equipment and the like.

According to another embodiment of the present disclosure, the at least one processor is configured to select a pixel mask to be used in the matching process from a plurality of directional pixel masks.

In accordance with another embodiment of the present invention, the at least one processor is further configured to select a pixel mask to be used in the matching process from among the plurality of directional pixel masks by identifying a direction for which the neighboring pixels comprised in the selected directional pixel mask have a minimal signal variance.

By yet another embodiment of the present disclosure, the at least one processor is further configured to affect a geometrical concatenation of all pixel masks for which the ratio between the mask standard deviation and the minimal value of the minimal signal variance, is less than a value of a pre-defined threshold.

According to another aspect of the present invention there is provided a method for use in a process of matching pairs of pixels, wherein members of a pixel's pair belong each to another image captured by a different image capturing sensor, and the process of matching pairs of pixels is based on selecting a pixel mask to be used by selecting neighboring pixels of a given pixel from among all of its neighboring pixels, will be used for the matching process of the given pixel with the other member of its pixel's pair.

According to still another embodiment of this aspect of the present disclosure, the method provided further comprises a step of selecting a pixel mask to be used in the matching process from a plurality of directional pixel masks.

In accordance with another embodiment of the present disclosure, the step of selecting a pixel mask to be used in the matching process from among the plurality of directional pixel masks, comprises identifying a direction for which the neighboring pixels comprised in the selected directional pixel mask have a minimal signal variance.

By yet another embodiment of the present disclosure, the method provided further comprises a step of affecting a geometrical concatenation of all pixel masks for which the ratio between the mask standard deviation and the minimal value of the minimal signal variance, is less than a value of a pre-defined threshold.

According to another aspect of the present disclosure, there is provided an image capturing sensor comprising a computational platform as described hereinabove.

BRIEF DESCRIPTION OF THE DRAWINGS

For a more complete understanding of the present invention, reference is now made to the following detailed description taken in conjunction with the accompanying drawings wherein.

DETAILED DESCRIPTION

In this disclosure, the term "comprising" is intended to have an open-ended meaning so that when a first element is stated as comprising a second element, the first element may also include one or more other elements that are not necessarily identified or described herein, or recited in the claims.

In the following description, for the purposes of explanation, numerous specific details are set forth in order to provide a better understanding of the present invention by way of examples. It should be apparent, however, that the present invention may be practiced without these specific details.

The present disclosure relates to a solution of selecting certain pixels from among all pixels that surround a given pixel, thereby enabling to calculate a mask for a given pixel.

Figure 4:
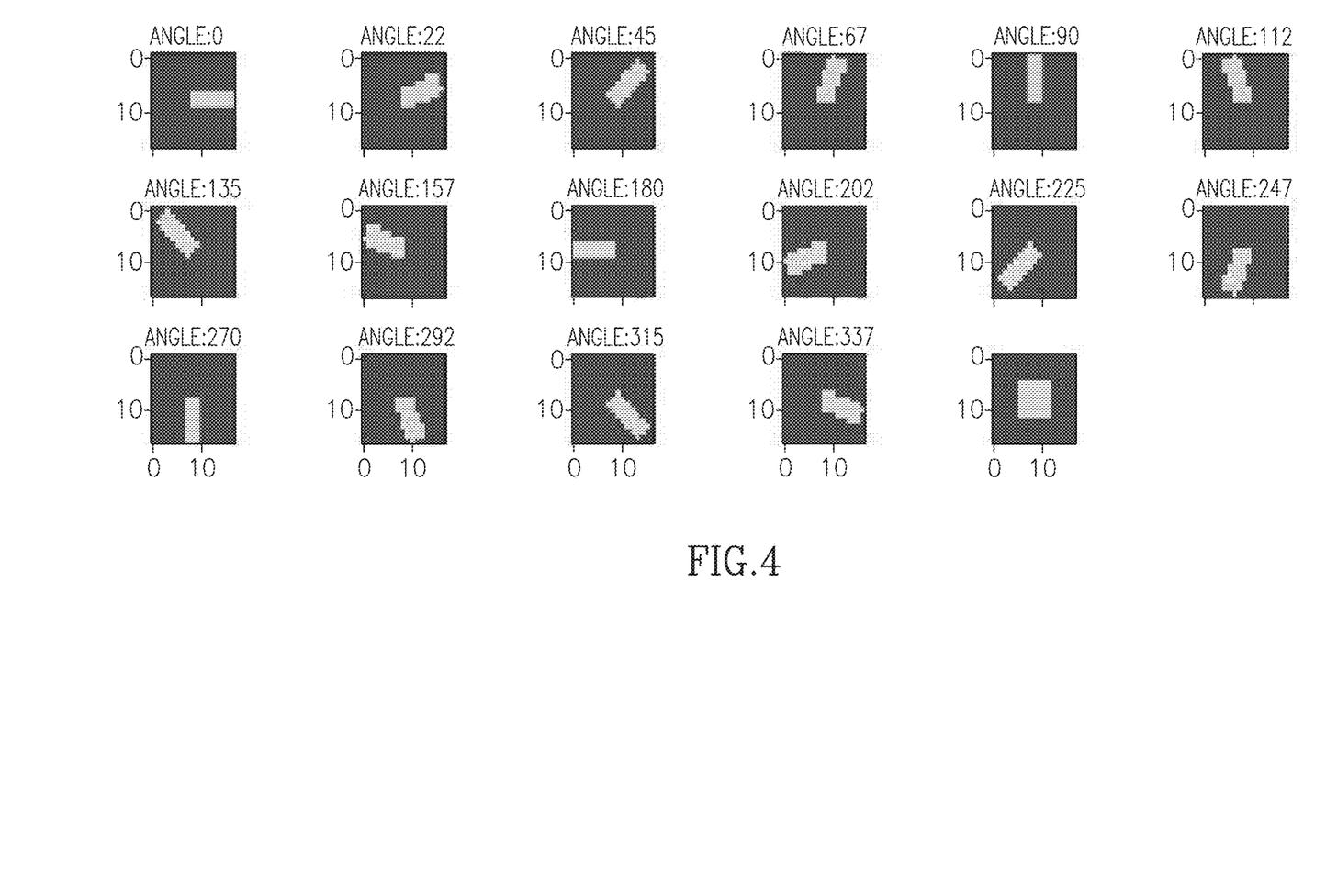
FIG. 4 illustrates an example of a set of possible directional masks.

FIG. 4 illustrates an example of a set of possible directional masks. Each mask includes the given pixel itself and its neighboring pixels in a selected direction. The example illustrates in FIG. 4 comprises a set of 16 possible reference masks that are generated by rotating the initial horizontally oriented mask, having a length W and a height H, by about 22.5 degrees CCW. An additional mask, the seventeenth mask, is simply a box of the size n×n.

Selecting the mask size is a rather significant step in the solution provided. One example for making such a selection is described herein:

1. Assuming that the geometry of the projected pattern as well as the image sensor resolution of the given system, are known. Parameters W and H are selected to satisfy a minimal value that would allow including within any directional mask (filter) at least part of the bright pattern (in this example—the bright part);
2. Confirming that the requirement of step (1) is satisfied for any spatial position of the image; and
3. Projecting the pattern on a plane, capturing the image of the projected pattern and repeating steps (1) and (2).

The described process enables adapting the masks' (filters) sizes for different electrooptical systems that differ from each other by the projected pattern, the field of view and/or the image sensor resolution.

Figure 5:
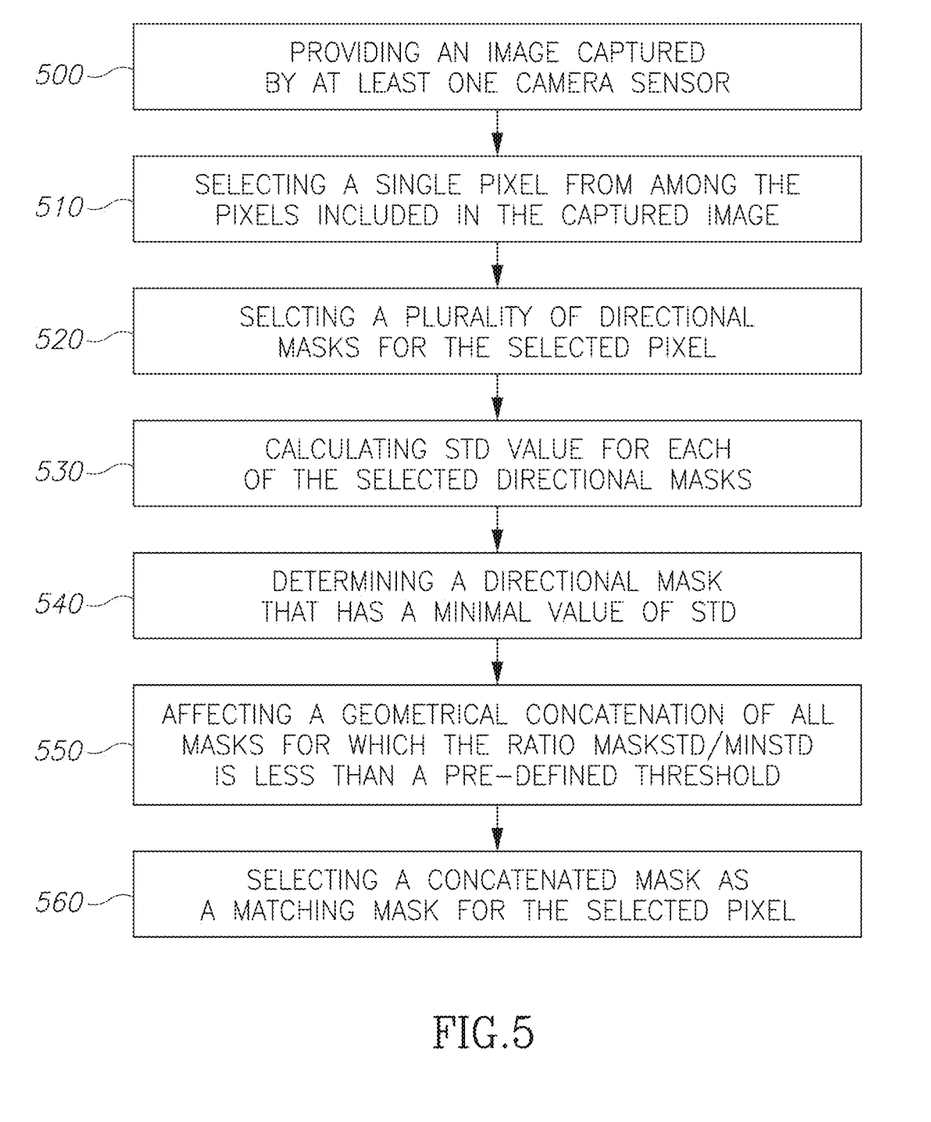
FIG. 5 presents a flow chart exemplifying a method for generating a matching mask in accordance with an embodiment construed in accordance with the present invention.

FIG. 5 presents a flow chart exemplifying a method for generating a matching mask in accordance with an embodiment construed in accordance with the present invention.

First, stereo images comprising a projected pattern captured by at least one image sensor (step 500) are provided, and selecting a single pixel from the pixels included in the captured image (step 510).

Next, a plurality of directional masks is selected for the selected pixel (step 520). For each of the selected directional masks, based on the pixel values, calculating the statistical parameter std, where std is a standard deviation of the values of all pixels included in a respective selected directional mask (step 530).

Once the step of calculating the statistical parameter std has been completed for all the directional masks, determining a directional mask that has a minimal value of std, thereby identifying a direction that has minimal signal variance (minStd) (step 540).

Affecting a geometrical concatenation of all masks for which the ratio of the mask standard deviation (maskStd) and the minimal value of std (minStd) is less than a value a pre-defined threshold of (i.e., maskStd/minStd<threshold) (step 550). The main idea behind this step is to unite all directional masks having a similar variance (e.g., masks that comprise information that relates to the same region of the captured image) in order to increase the number of pixels comprised in the matching mask. This step increases statistical robustness of the calculation since it enables to base the calculation on a higher number of observations for which the statistics is carried out.

Finally, a concatenated mask is selected as a matching mask for the selected pixel (step 560).

The following figures illustrate the method described hereinabove for different use cases.

Figure 6:
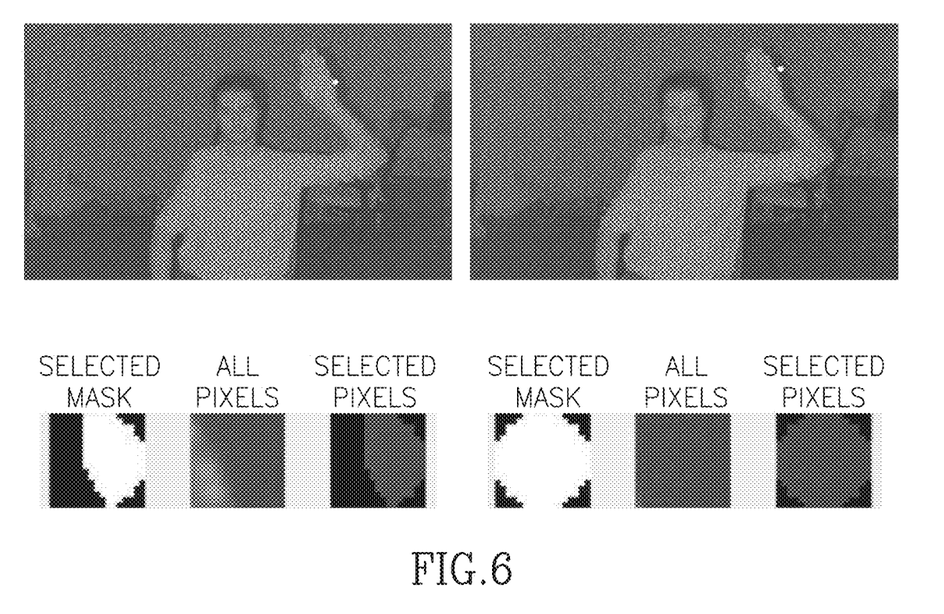
FIG. 6 presents an example construed in accordance with an embodiment of the present invention of selecting a matching mask for pixels located in the occlusion area.

Two captured stereo images are shown in the top part of FIG. 6 and the process is carried out with respect to the occlusion area, and in these two captured stereo images the marked points indicate each a point for which the matching mask is calculated.

Underneath each of the two captured stereo images, three images are presented, the left image represents a selected matching mask, the central image represents an area near the point of interest and the right image presents pixels selected for the matching process according to the matching mask.

Two pixels were selected in the occlusion area: a first pixel being a pixel that is close to the foreground hand, whereas the second pixel lies in the middle of the occlusion area.

In the first case one must avoid including pixels that relate to the foreground hand, as part of matching window, thereby the method provided in accordance with the present invention, enables to successfully eliminate the "hand" part from the matching window.

As opposed to that, in the second case, the pixel lies far away from the foreground hand, thus, a matching window can be used, which includes the maximal number of the neighboring pixels.

Figure 7:
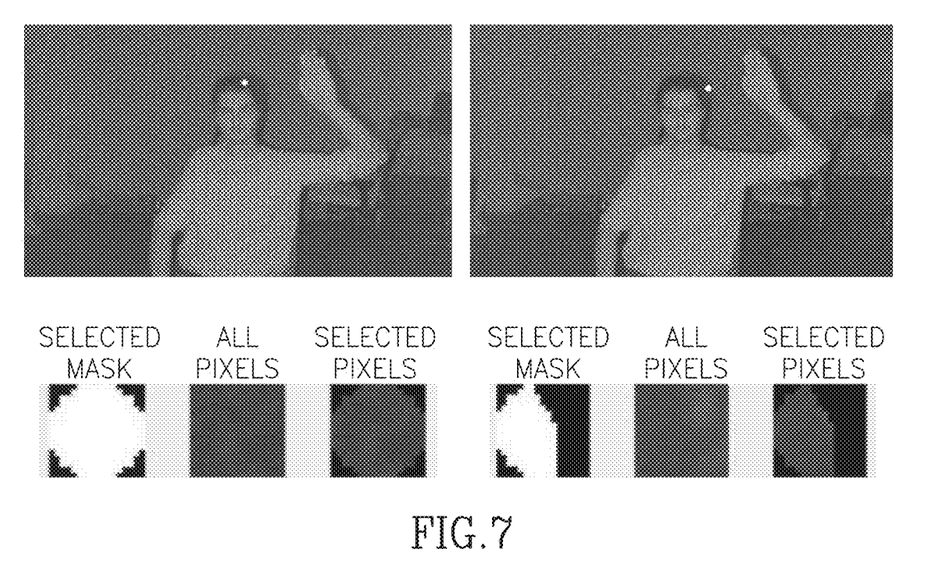
FIG. 7 presents another example construed in accordance with an embodiment of the present invention of selecting a matching mask for pixels located in a low reflectivity area (hair)

The example illustrated in FIG. 7 relates to points located in an area having a low reflectivity (hair).

In the two captured stereo images presented in FIG. 7, the marked points indicate points for which the matching mask is calculated. For the point that lies near the hair's contour, the method of the present invention of mask selection avoids including pixels from the background.

Figure 8:
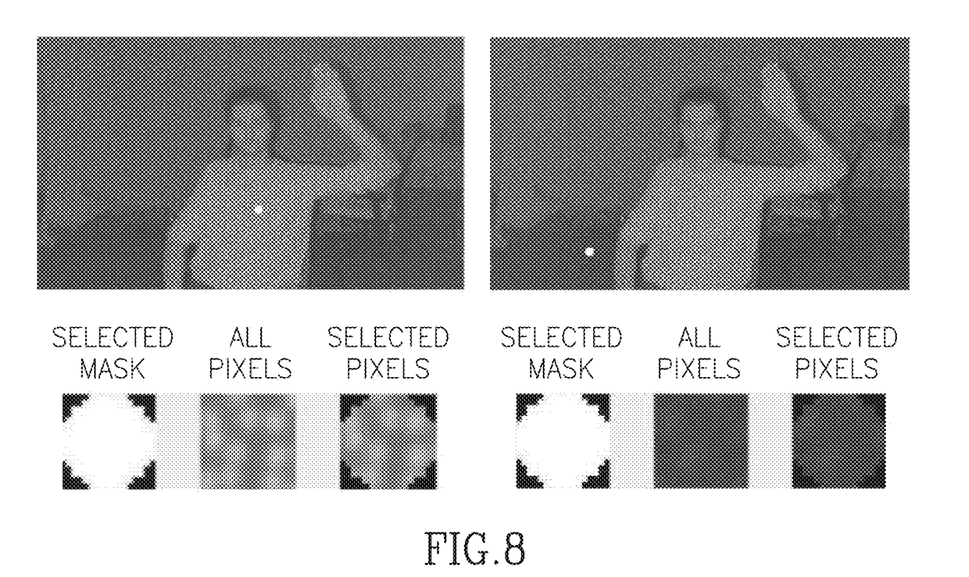
FIG. 8 presents another example construed in accordance with an embodiment of the present invention of selecting a matching mask for pixels located on a homogenous surface.

In the two captured stereo images presented in FIG. 8, masks with maximal size were selected for the marked points that have a homogeneous neighboring area.

In summary, the solution provided by the present invention enables carrying out an improved selection of a pixels' mask around pixels located in areas of interests.

Moreover, this solution adaptation of geometrical parameters (generating the proper height and width for the directional masks) to suit a given optical system, and/or a projected pattern, and/or image sensor's (e.g., camera) field of view (FOV) and/or image sensors' (e.g., cameras) resolution.

There are a number of implementations where such a matching window generated in accordance with the solution provided by the present invention can be used. For example, depth calculation of a scene whose image is captured by two stereo image capturing devices. In such an implementation the matching procedure can be used to adopt a respective matching window geometry for each point instead of using a standard rectangular window. By doing that, the calculation process avoids error caused by depth artifacts, especially when located near the contours that separate background-foreground objects or between occlusion areas and areas that comprise meaningful information.

The robustness of the matching result may be predicted based on a metric Not really calculated by using the proper and accurate matching mask as provided by the present invention.

Figure 9:
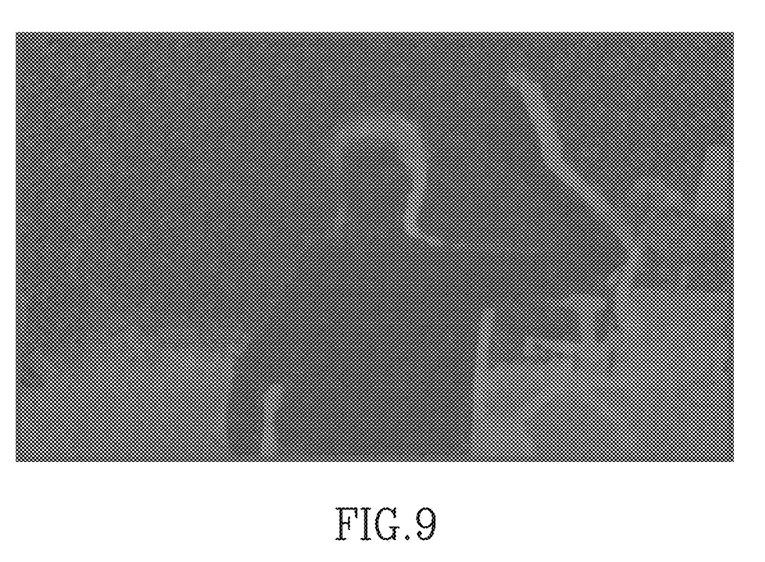
FIG. 9 demonstrates an example of results obtained by using information metrics calculated based on the use of matching masks.

FIG. 9 demonstrates an example of an outcome of such a calculation. Brighter areas are related to surfaces for which low matching robustness is expected, such as occlusions, areas with low signal (large errors that are caused due to the existence of high noise thereat).

Figure 10:
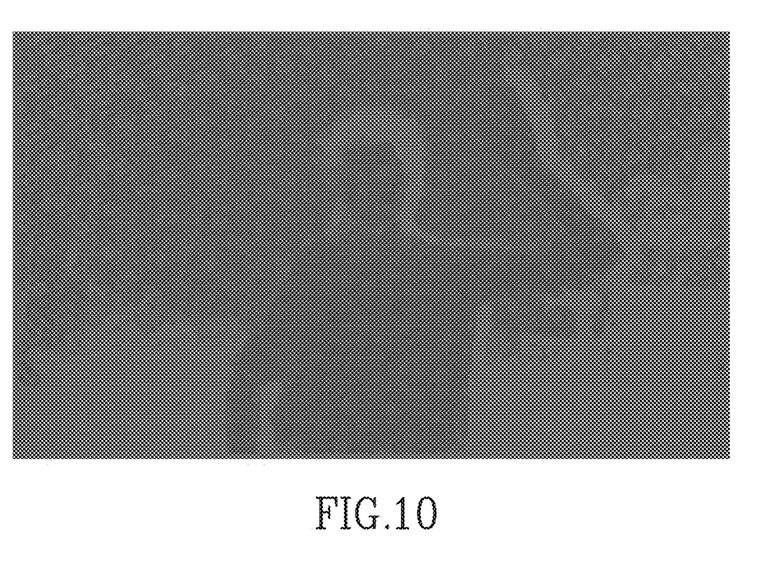
FIG. 10 demonstrates another processing example of the information map after applying a selected threshold in the calculation process.

FIG. 10 illustrates the results of a process of generating an information map on the base of a calculated metrics. The somewhat lighter pixels have a value that exceeds a certain threshold and represent areas associated with large potential errors in their calculation. The threshold that is used throughout the process is adaptive and may be selected to suit a specific customer's use and hardware parameters (e.g., a projector and an image sensor).

In the description and claims of the present application, each of the verbs, "comprise" "include" and "have", and conjugates thereof, are used to indicate that the object or objects of the verb are not necessarily a complete listing of members, components, elements or parts of the subject or subjects of the verb.

The present invention has been described using detailed descriptions of embodiments thereof that are provided by way of example and are not intended to limit the scope of the invention in any way. The described embodiments comprise different features, not all of which are required in all embodiments of the invention. Some embodiments of the present invention utilize only some of the features or possible combinations of the features. Variations of embodiments of the present invention that are described and embodiments of the present invention comprising different combinations of features noted in the described embodiments will occur to persons of the art. The scope of the invention is limited only by the following claims.

The invention claimed is:

1. A computational platform for use in a process of deriving depth from stereo images, the platform comprising: a) two image capturing sensors; b) a pattern projector configured to emit a pre-defined pattern into a common field of view of the two image capturing sensors; and c) at least one processor configured to enable projecting the pre-defined pattern on a plane and to capture the image of the projected pre-defined pattern and to carry out a process of matching pairs of pixels belonging to the captured images, wherein said matching process is based on selecting for each given pixel, a pixel mask defined by neighboring pixels to be used in matching said given pixel with its counterpart in the other image from among a plurality of directional pixel masks, and wherein selecting each given pixel's mask from among the plurality of directional pixel masks is based on identifying a direction for which the neighboring pixels comprised in the selected directional pixel mask have a minimal signal variance.

2. The computational platform of claim 1, wherein the at least one processor is further configured to affect a geometrical concatenation of all pixel masks for which the ratio between the mask standard deviation and the minimal value of the minimal signal variance, is less than a value of a pre-defined threshold.

3. A method for deriving depth from stereo images, by a computational platform that comprises: a) two image capturing sensors; b) a pattern projector configured to emit a pre-defined pattern into a common field of view of the two image capturing sensors; and c) at least one processor configured to enable projecting the pre-defined pattern on a plane and to capture the image of the projected pre-defined pattern and wherein the method comprises matching pairs of pixels belonging to two images captured by a respective one of the two image capturing sensors, by selecting for each given pixel, a pixel mask defined by neighboring pixels in matching said given pixel with its counterpart in the other image, from a plurality of directional pixel masks, and wherein selecting each given pixel's mask from among the plurality of directional pixel masks is based on identifying a direction for which the neighboring pixels comprised in the selected directional pixel mask have a minimal signal variance.

4. The method of claim 3, further comprising a step of affecting a geometrical concatenation of all pixel masks for which the ratio between the mask standard deviation and the minimal value of the minimal signal variance, is less than a value of a pre-defined threshold.

5. An image capturing apparatus comprising the computational platform as claimed in claim 1.

* * * * *